US009470890B2

United States Patent
Mills (10) Patent No.: US 9,470,890 B2
(45) Date of Patent: Oct. 18, 2016

(54) FOGLESS SHOWER MIRROR

(71) Applicant: Brookstone Purchasing, Inc., Merrimack, NH (US)

(72) Inventor: Stephen B. Mills, Atkinson, NH (US)

(73) Assignee: Brookstone Purchasing, Inc., Merrimack, NH (US)

(*) Notice: Subject to any disclaimer, the term of this patent is extended or adjusted under 35 U.S.C. 154(b) by 21 days.

(21) Appl. No.: 14/156,591

(22) Filed: Jan. 16, 2014

(65) Prior Publication Data

US 2015/0198803 A1 Jul. 16, 2015

(51) Int. Cl.
*G02B 27/00* (2006.01)
*A45D 42/10* (2006.01)
*A45D 42/14* (2006.01)

(52) U.S. Cl.
CPC ........... *G02B 27/0006* (2013.01); *A45D 42/10* (2013.01); *A45D 42/14* (2013.01)

(58) Field of Classification Search
CPC .............. G02B 5/0808; G02B 7/1815; G02B 27/0006; G02B 7/182; H05B 3/845; A45D 42/10; A45D 42/00; A45D 42/14; A45D 42/08; A47G 1/00; A47G 1/02; Y10S 383/901
USPC ....... 359/509, 512, 514, 838, 845, 879, 585, 359/586, 588, 589, 603, 839, 840, 844, 846, 359/860, 884, 900, 507, 871; 219/219, 522, 219/492, 543, 203, 213, 493, 497, 526, 528, 219/546, 552; 248/467; 383/901; 4/605
See application file for complete search history.

(56) References Cited

U.S. PATENT DOCUMENTS

| 2,853,263 | A | * | 9/1958 | Murray | 251/74 |
| 4,832,475 | A | * | 5/1989 | Daniels | 359/512 |
| 5,349,943 | A | * | 9/1994 | Ruiz | 600/189 |
| 5,416,635 | A | * | 5/1995 | Christianson et al. | 359/509 |
| 6,238,052 | B1 | * | 5/2001 | Zadro | 359/507 |
| 8,746,901 | B1 | | 6/2014 | Zadro | |
| 8,858,001 | B2 | * | 10/2014 | Parisi et al. | 359/509 |

FOREIGN PATENT DOCUMENTS

| CN | 203195199 U | * | 9/2013 |
| JP | 2003000407 A | * | 1/2003 |

* cited by examiner

*Primary Examiner* — Scott J Sugarman
*Assistant Examiner* — Ibrahima Diedhiou
(74) *Attorney, Agent, or Firm* — Grossman Tucker Perreault & Pfleger, PLLC (57) ABSTRACT

A fogless mirror assembly includes a mirror enclosure and a water reservoir configured to be removably coupled to the mirror enclosure. The mirror enclosure includes a mirror and a frame defining an internal cavity having a water inlet and a water drain. The water reservoir defines a fluid cavity and includes a water outlet and an outlet valve configured to automatically open the water outlet when the water reservoir is coupled to the mirror enclosure such that a volume of water flows from the fluid cavity, into the internal cavity through the water inlet, and exits the internal cavity through the water drain to transfer thermal energy from the water to the mirror thereby increasing the temperature of the mirror from a starting temperature to at least approximately a dew point of water vapor proximate to mirror.

16 Claims, 12 Drawing Sheets

FOGLESS SHOWER MIRROR

PRIORITY INFORMATION

N/A

RELATED APPLICATIONS

N/A

FIELD

Embodiments of this invention relate to apparatus for a mirror, and more particularly, to a fogless shower mirror.

BACKGROUND

Many people find it beneficial to have a mirror in the shower, for example, to shave, remove makeup, and the like. Unfortunately, the large amount of water vapor generated by the hot water during a shower tends to form condensation droplets (e.g., fog) on the surface of the mirror, thereby blocking the user's reflection. Fog typically forms on shower mirrors because the surface temperature of the mirror is cooler than the dew point of the water vapor in the air generated by the shower.

One approach to solving this problem includes heated mirrors. Unfortunately, heated mirrors suffer from several problems. For example, heated mirrors may be more expensive because of the heating device. Additionally, heated mirrors need a power source (e.g., batteries) that must be replaced often, especially if the heater is accidentally left on for an extended period of time. Moreover, the high humidity may cause the heating device to stop working.

Another approach to solving the problem includes applying coatings to the surface of the mirror. Unfortunately, these coating may be expensive and often of a limited lifespan and suffer limited operating conditions (e.g., they may not work if the ambient temperature of the mirror surface is too cool compared to the dew point).

Yet another approach includes mirrors that are connected to (i.e., plumbed into) the shower. Water from the shower flows through the mirror, thereby increasing the temperature of the shower mirror. While generally effective, these mirrors may be very difficult to install because they need to be plumped into the shower pipe. Also, the placement of these mirrors is typically limited because of the need to be plumbed into the shower pipe.

BRIEF DESCRIPTION OF THE DRAWINGS

Embodiments of the present disclosure are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

By way of a general overview, one embodiment of the present disclosure is directed to a fogless mirror assembly. The fogless mirror assembly includes a mirror enclosure and a water reservoir. The mirror enclosure includes a mirror and frame. The frame defines an internal cavity having a water inlet configured to receive warm/hot water from the water reservoir and a water drain to allow the water to exit the internal cavity. As the warm/hot water flows through the internal cavity, the warm/hot water transfers thermal energy to the mirror thereby increasing the temperature of the mirror from a starting temperature (e.g., ambient room temperature) to approximately the dew point of the water vapor near the mirror. Once the mirror is at or near the dew point, fog generally will not condense on the mirror. Optionally, the water reservoir may be removably coupled to the mirror enclosure and includes a valve which seals the water outlet of the water reservoir and automatically opens the water outlet when the water reservoir is coupled to the mirror enclosure.

Figure 1:
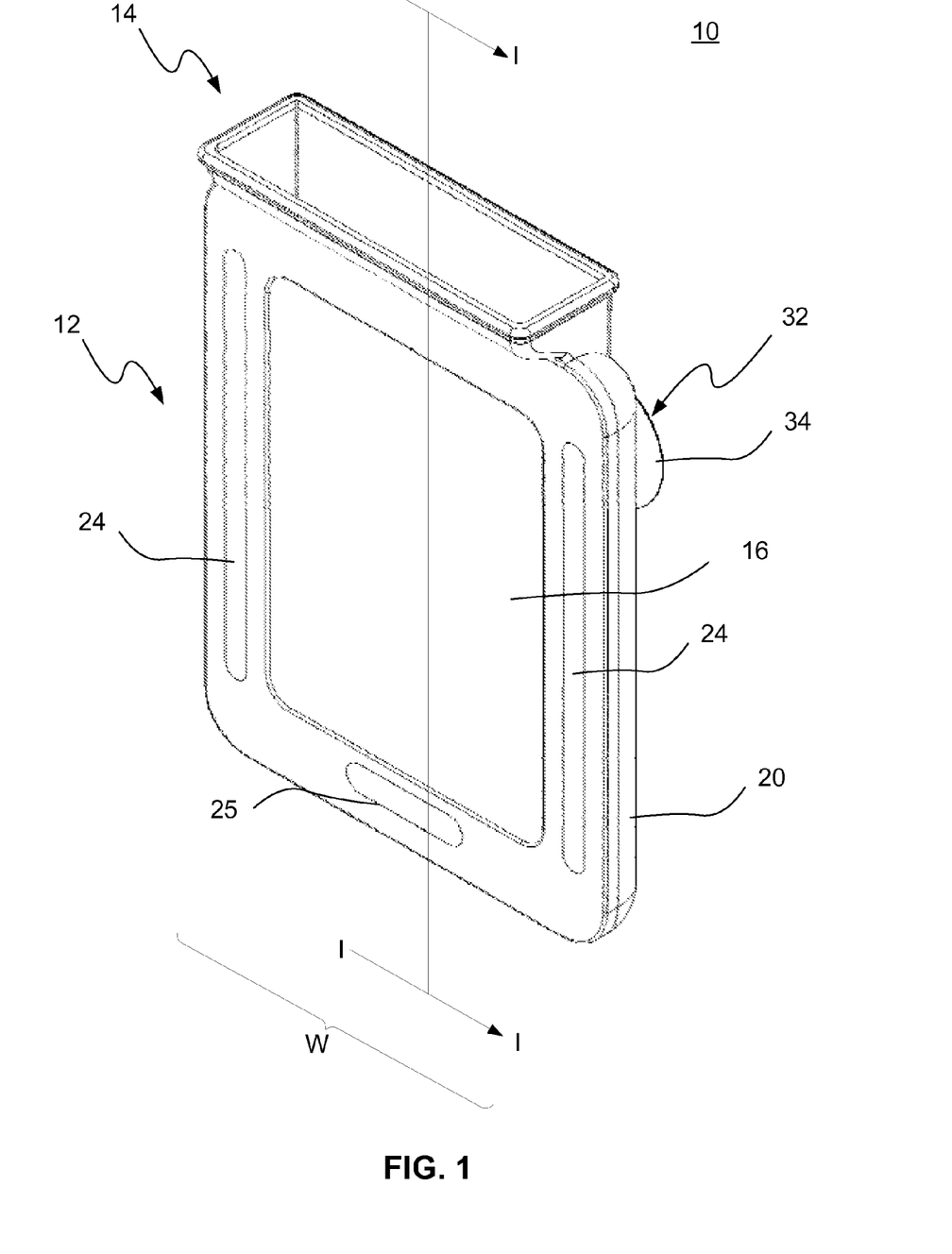
FIG. 1 generally illustrates a front perspective view of one embodiment of a fogless mirror assembly consistent with the present disclosure.
Figure 2:
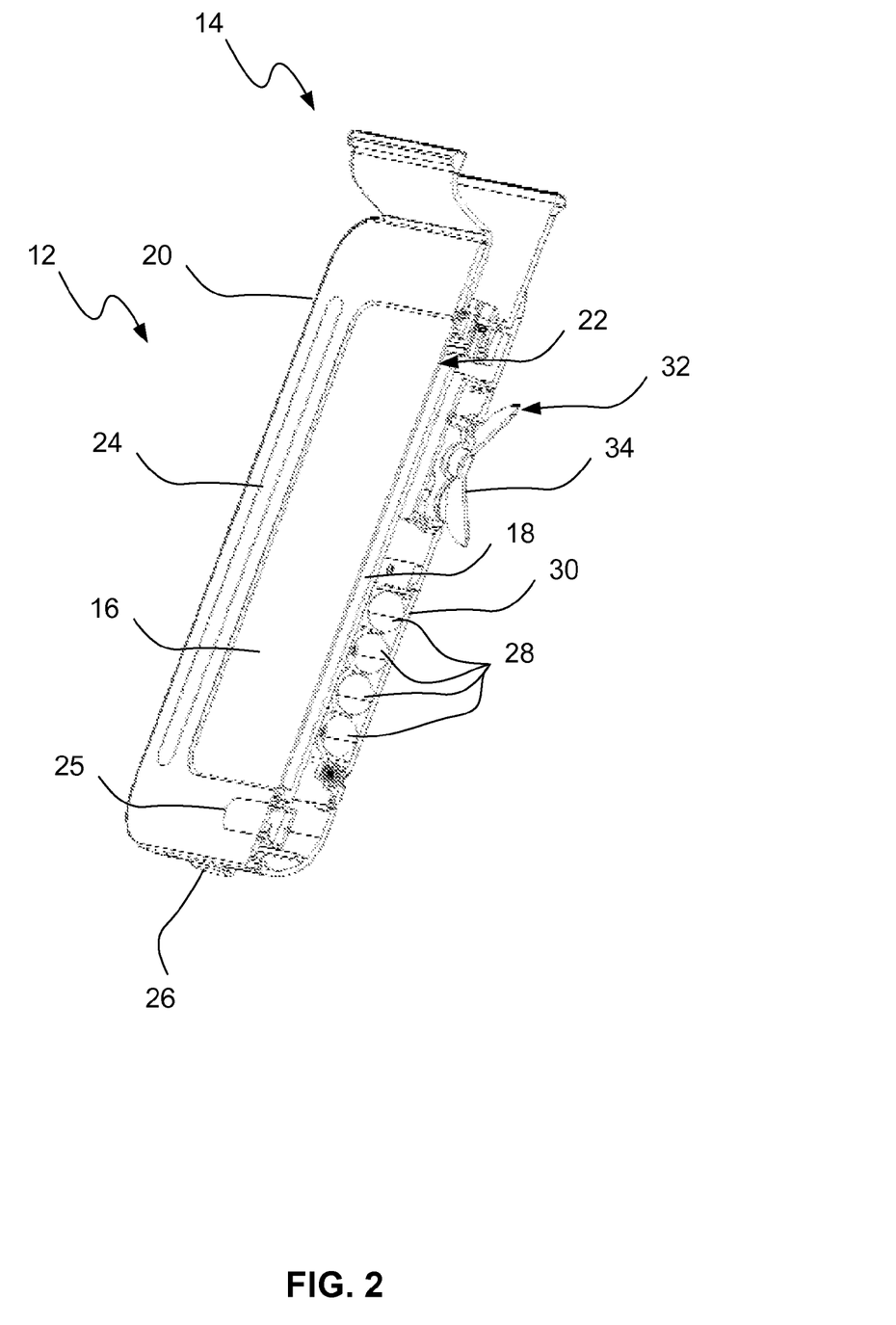
FIG. 2 generally illustrates a cross-sectional view of the fogless mirror assembly taken along lines I-I of FIG. 1.

Turning now to FIGS. 1 and 2, a front perspective view of one embodiment of a fogless mirror assembly 10 consistent with the present disclosure is generally illustrated along with a cross-sectional view of the fogless mirror assembly 10 taken along lines I-I of FIG. 1. The fogless mirror assembly 10 includes a mirror enclosure 12 and one or more water reservoirs 14. The mirror enclosure 12 includes a mirror 16 and defines at least one internal water cavity 18 (best seen in FIG. 2). As will be explained herein in greater detail, hot water from the water reservoir 14 flows into the water cavity 18 of the mirror enclosure 12 to increase the temperature of the mirror 16 from ambient room temperature (i.e., the temperature of the room before the shower) to approximately equal to or greater than the dew point of the water vapor in the region proximate the fogless mirror assembly 10.

The mirror enclosure 12 includes a housing or frame 20 configured at least partially to contain the mirror 16 such that thermal energy from the water in the internal water cavity 18 is transferred to the mirror 16. According to one embodiment, the mirror 16 is sealed to the frame 20 such that at least a portion of the rear surface 22 of the mirror 16 forms part of the internal water cavity 18. In such an embodiment, the rear surface 22 of the mirror 16 generally directly contacts the water within the internal water cavity 18. The internal water cavity 18 may have a volume, for example, of 3.8 oz. The mirror 16 may include any reflective surface upon which a user can see his/her reflection. For example, the mirror 16 may include plane mirrors (which have a generally flat surface) and/or curved mirrors. One or more portions of the mirror 16 may optionally magnify and/or diminish the image. Optionally, the magnification and/or demagnification of the mirror 16 may be selected by the user.

According to one embodiment, the mirror 16 may be made from a material with a relatively high thermal conductivity. For example, the mirror 16 may include a material having a thermal conductivity greater than 10 W/(m*K). Manufacturing the mirror 16 from a material having a relatively high thermal conductivity decreases the amount of time necessary to increase the temperature of the mirror 16 to the dew point temperature. In addition, the relatively high thermal conductivity may also reduce the volume of the water necessary to flow through the internal water cavity 18, thereby decreasing the volume of the water reservoir 14. In the exemplary embodiment, the mirror 16 may include one or more sheets of polished stainless steel such as, but not limited to, polished, SAE type 303 stainless steel. The polished stainless steel is also resistive to chemical reactions with the water (e.g., corrosion, rust, or staining).

The mirror enclosure 12 may optionally include one or more lights 24. The lights 24 may include any type of lighting source such as, but not limited to, light emitting diodes (LEDs), light pipes, or the like. The lights 24 may be selectively powered, for example, using one or more buttons 26. Optionally, the mirror enclosure 12 may include a radio, music player (e.g., but not limited to, digital music player/speakers), clock, display, and/or the like 25. The mirror enclosure 12 may also include a power source, such as one or more batteries 28 disposed in a waterproof battery compartment 30 (as best seen in FIGS. 2 and 3), for providing power to the lights 22, radio, music player, clock, and/or display 25.

Figure 3:
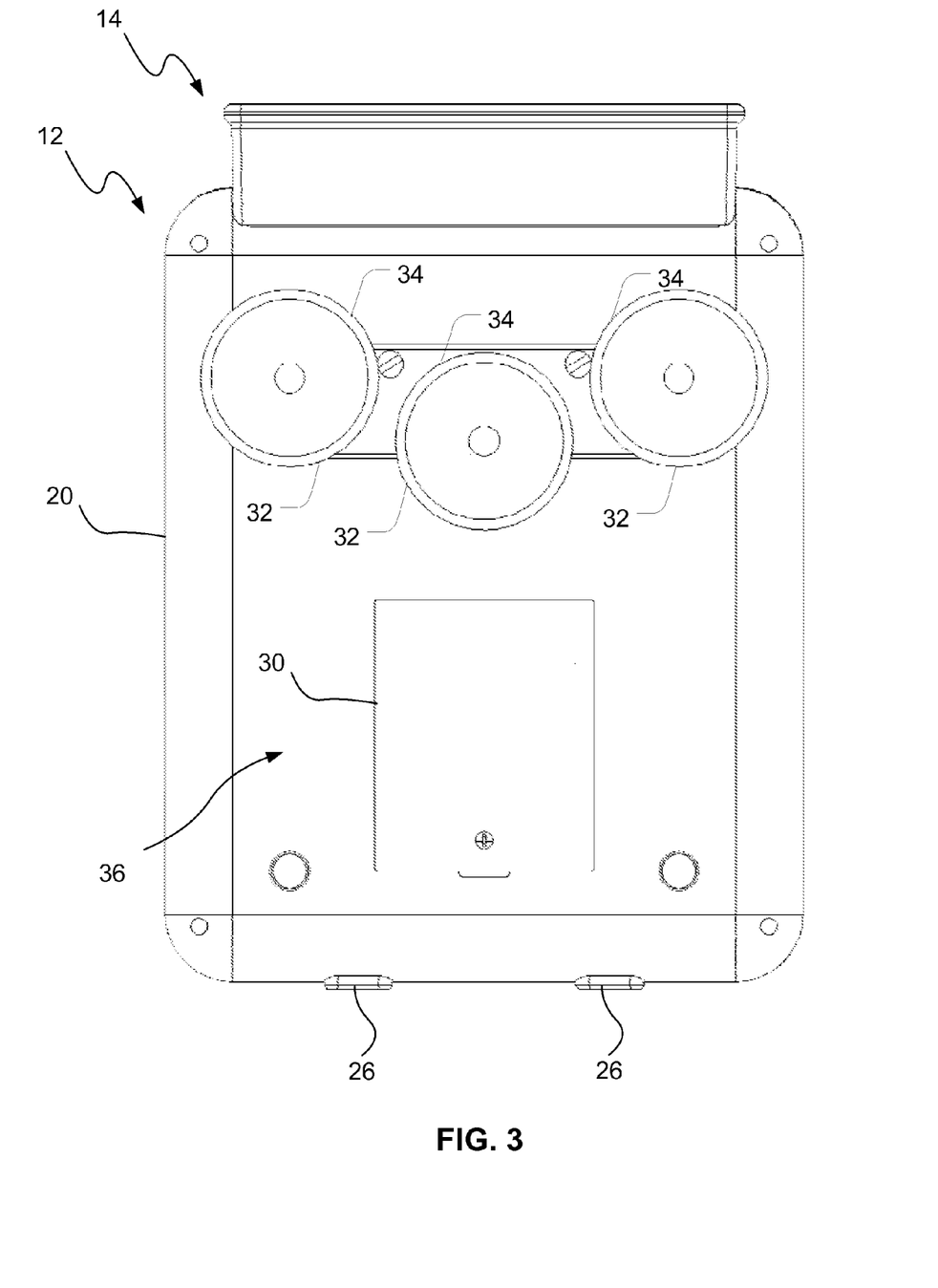
FIG. 3 generally illustrates a rear or back view of the fogless mirror assembly according to one embodiment.
Figure 4:
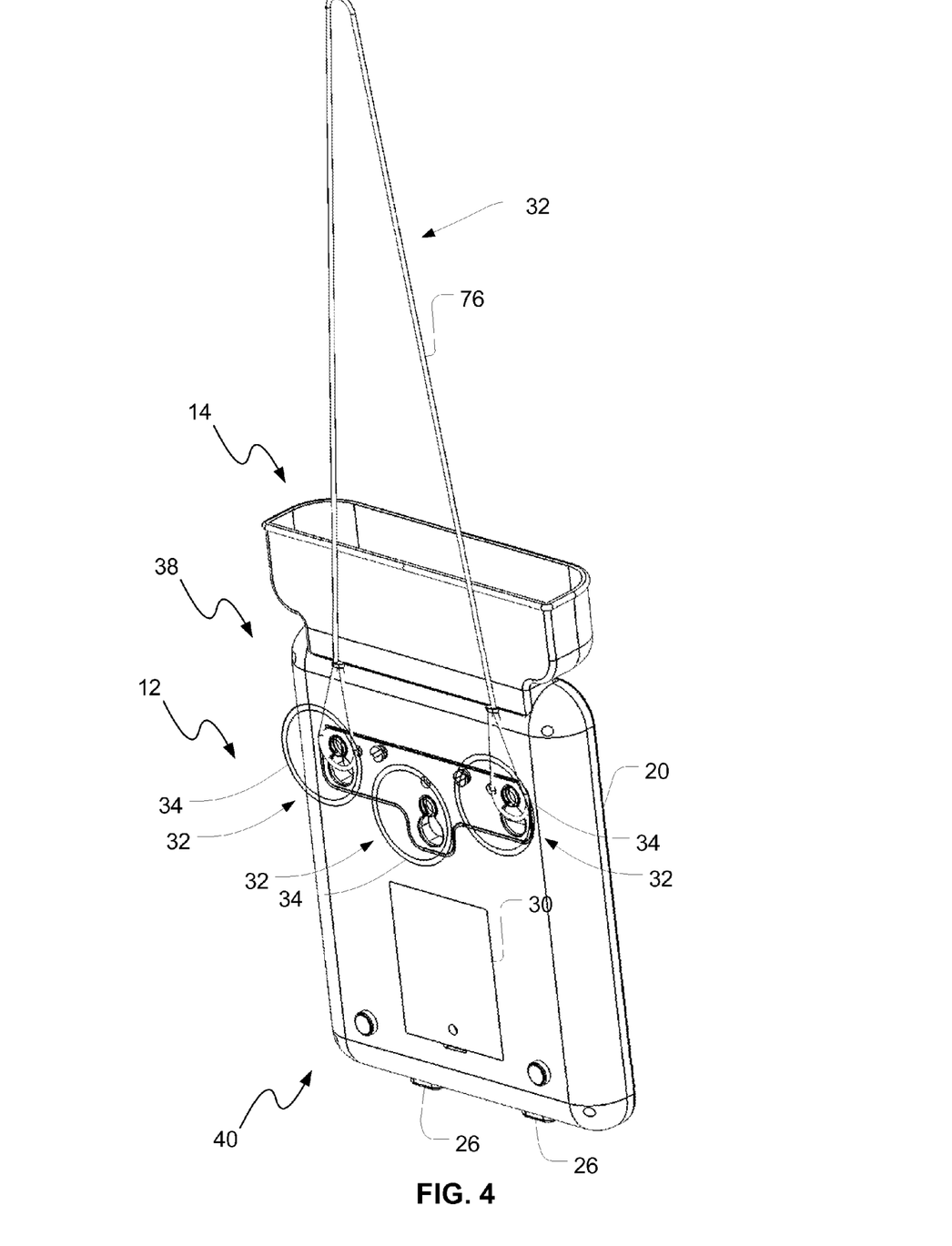
FIG. 4 generally illustrates a rear view of another embodiment of a fogless mirror assembly including a lanyard FIG. 5 generally illustrates one embodiment of a cross-sectional view of the mirror enclosure taken along lines I-I of FIG. 1 without the water reservoir consistent with the present disclosure.

Turning now to FIG. 3, a rear or back view of the fogless mirror assembly 10 is generally illustrated. The mirror enclosure 12 may be secured to a structure (e.g., but not limited to, a wall of a shower or shower door, not shown for clarity) using one or more fasteners 32. For example, one or more of the fasteners 32 may include suctions cups/discs 34. The suctions cups/discs 34 may be removably coupled to the rear surface 36 of the mirror enclosure 12. Alternatively, one or more of the fasteners 32 may include a hook and loop type fastener, or an opening configured to receive the head of a nail or screw, and/or double-sided tape. For example, another embodiment of a fastener 32 which may be used with the fogless mirror assembly 10 is generally illustrated in FIG. 4. In particular, the fastener 32 may include a lanyard 76. The lanyard 76 may be secured to the mirror enclosure 12, for example, around one or more of the suction cups/discs 34 and/or to openings in the mirror enclosure 12. The lanyard 76 may form a least a partial loop, a portion of which may be disposed around a portion of a shower head/pipe. The lanyard 76 may be particularly suited for applications that do not have a smooth surface that the suction cups/discs 34 may be secured. The lanyard 76 may include a stainless steel (e.g., SS 303) chain or braid. Optionally, the lanyard 67 may be coated with a polymeric material, e.g., a jacket such as polyvinyl chloride (PVC).

Figure 5:
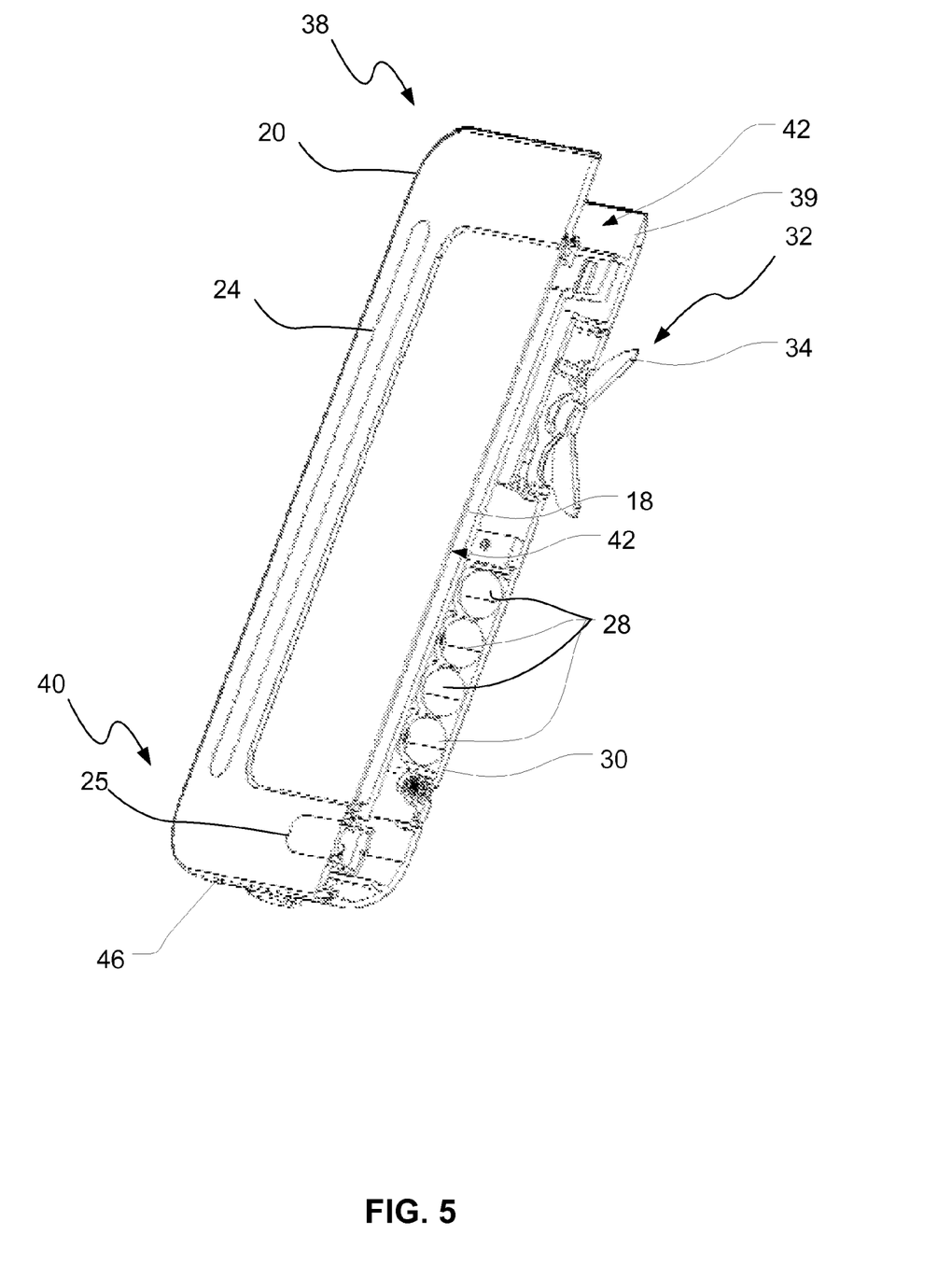
Figure 6:
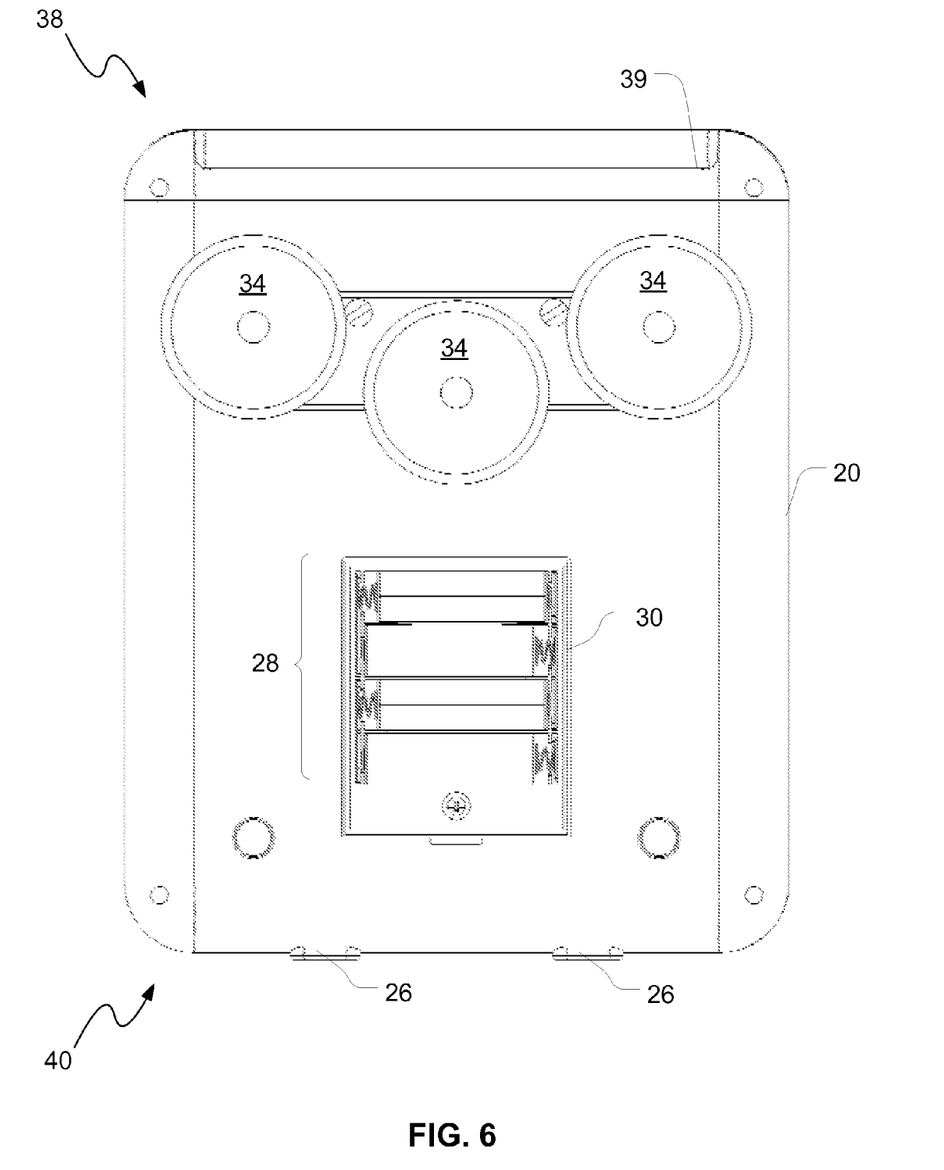
FIG. 6 generally illustrates a rear/back view of the mirror enclosure according one embodiment.
Figure 7:
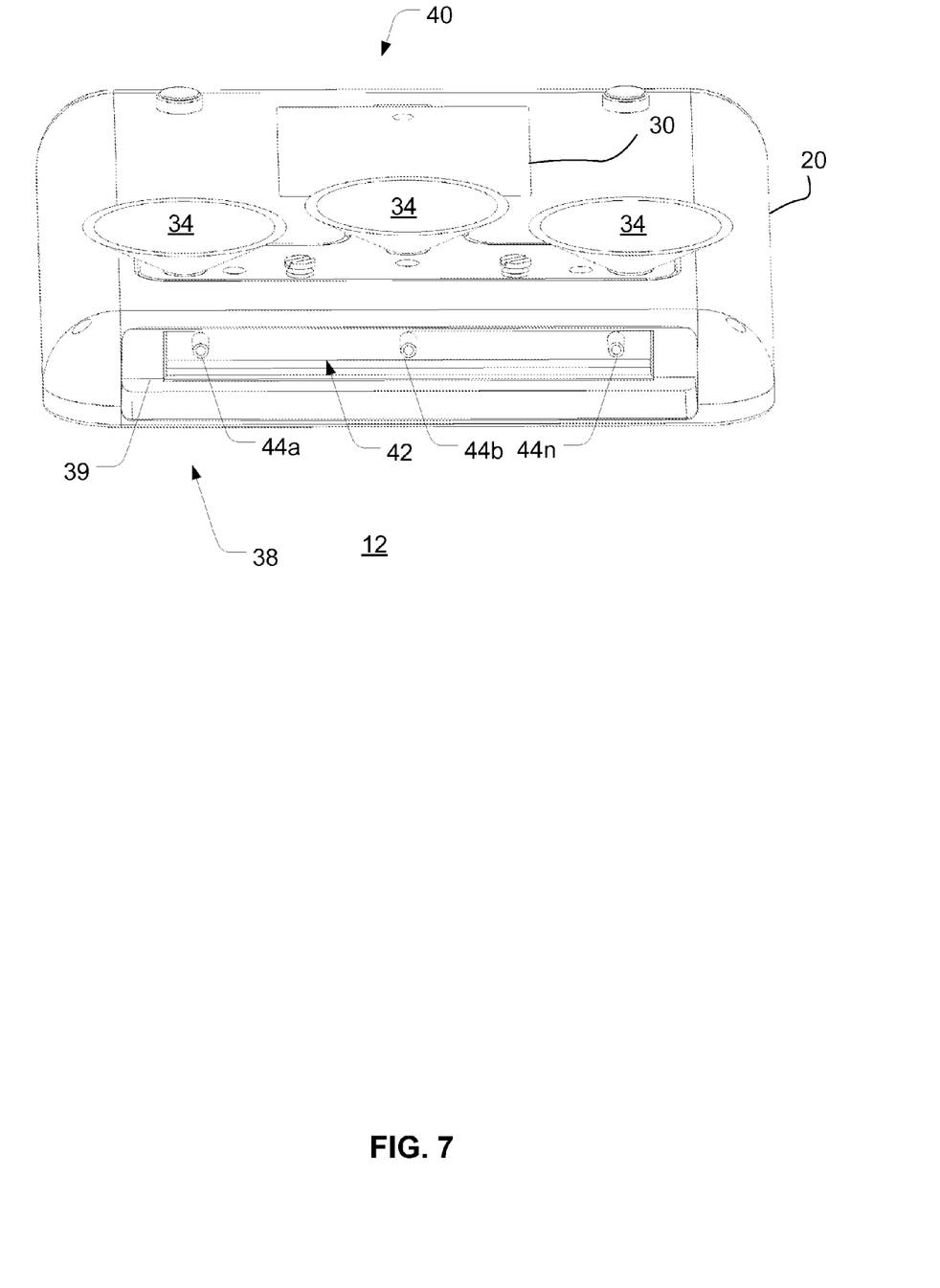
FIG. 7 generally illustrates a top view of the mirror enclosure according one embodiment.
Figure 8:
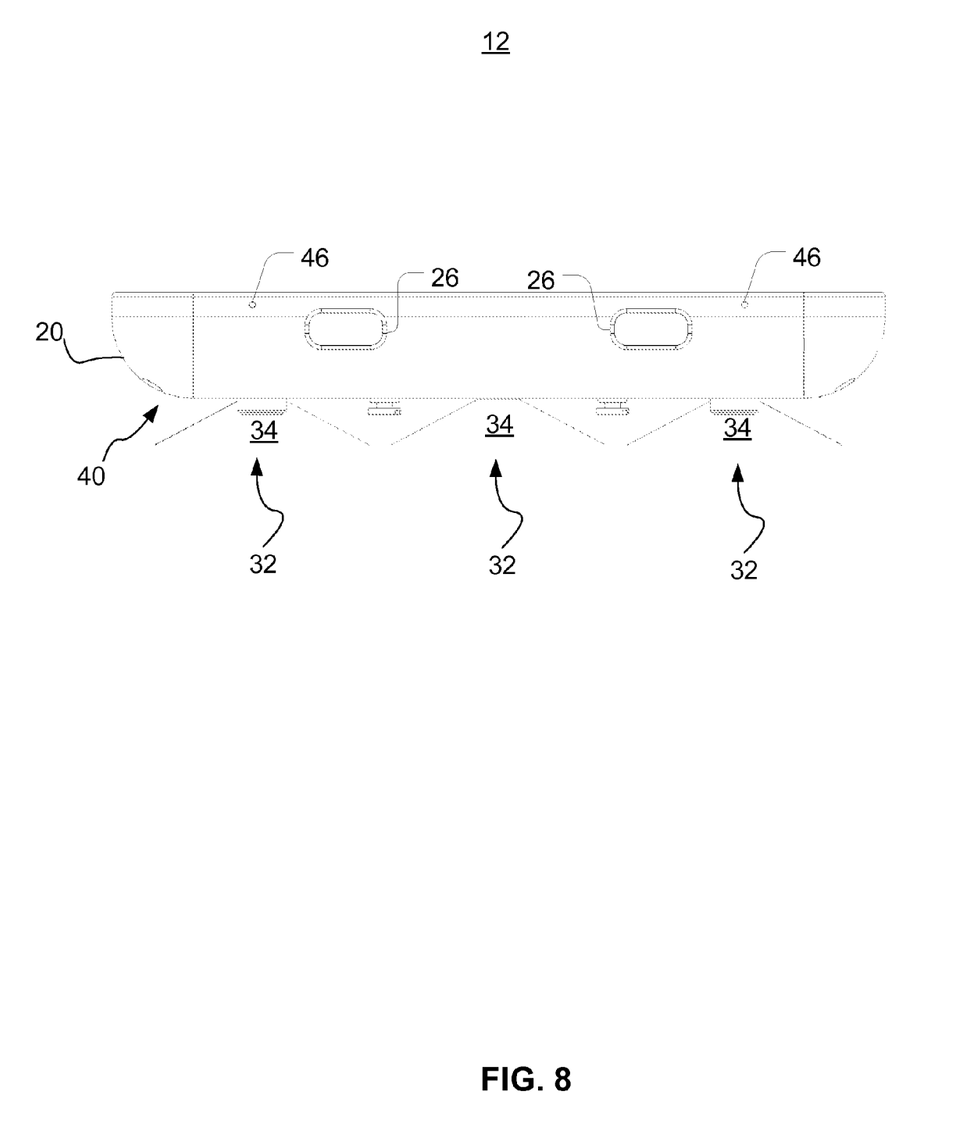
FIG. 8 generally illustrates a bottom view of the mirror enclosure according one embodiment.

Referring now to FIGS. 5-8, various views of the mirror enclosure 12 without the water reservoir 14 consistent with one embodiment of the present disclosure are generally illustrated. In particular, FIG. 5 is a cross-sectional view of the mirror enclosure 12 taken along lines I-I of FIG. 1 without the water reservoir 14, FIG. 6 is rear/back view of the mirror enclosure 12, FIG. 7 is top view of the mirror enclosure 12, and FIG. 8 is bottom view of the mirror enclosure 12. The mirror enclosure 12 includes a top region 38 and a bottom region 40 disposed about a generally opposite the top region 38. The top region 38 of the mirror enclosure 12 is configured to be coupled to and support the water reservoir 14. As best seen in FIGS. 5-7, the top region 38 of the mirror enclosure 12 may define a support cavity 39 configured to receive and support at least a portion of the water reservoir 14 (not shown in these figures for clarity).

According to one embodiment, the top region 38 includes at least one water inlet 42 (best seen in FIGS. 5 and 7) which is fluidly coupled to the internal water cavity 18. The water inlet 42 may be configured to allow a portion of the water reservoir 14 to be advanced into a portion of the water inlet 42 such that the water inlet 42 supports the water reservoir 14 (for example, as generally illustrated in FIGS. 1 and 3). Alternatively (or in addition), the mirror enclosure 12 may include one or more fasteners or the like (for example, but not limited to, biased clips, snaps, tabs, clamps, or the like, not shown) configured to generally secure the water reservoir 14 to the mirror enclosure 12. Optionally, the water inlet 42 and/or the water reservoir 14 may form a water-tight seal therebetween.

The water inlet 42 is sized and shaped to receive water from the water reservoir 18 and allows the water to flow into the internal cavity 18 substantially without any of the water bypassing the internal water cavity 18. The water inlet 42 may optionally include one or more valve elements 44a-44n (best seen in FIG. 7). As will be explained herein, the valve elements 44a-44n may engage a corresponding valve element of the water reservoir 18 to allow water from the water reservoir 18 to flow into the water inlet 42, and ultimately into the internal water cavity 18. According to one embodiment, one or more of the valve elements 44a-44n may include a boss, protrusion, rib, lip, finger, or the like that engages a corresponding valve element of the water reservoir 18 to open a valve and allow water to flow into the water inlet 42.

With reference to FIGS. 5 and 8, the bottom region 40 of the mirror enclosure 12 may include one or more water drains 46 fluidly coupled to the internal cavity 18. Water from the water reservoir 14 enters the internal cavity 18 through the water inlet 42 and exits through the water drains 46. The number and size of the water drains 46 may be selected such that water from the water reservoir 14 has sufficient time within the internal cavity 18 to transfer enough thermal energy to the mirror 16 to raise the temperature of the mirror 16 approximately to the dew point. The flow rate through the water inlet 42 and the flow rate through the water drains 46 may be selected to allow water from the water reservoir 14 to substantially fill up the internal cavity 18 such that thermal energy is transferred from the water to substantially the entire rear surface 22 of the mirror 16. As may therefore be appreciated, the size, number, and configuration of the water inlets 42 and the water drains 46, the internal cavity 18, and the volume of water that the water reservoir 14 holds will depend on the size of the mirror 16 and the intended operating conditions of the fogless mirror assembly 10 (e.g., the ambient or starting temperature of the fogless mirror assembly 10, the dew point for the water vapor in the air, the temperature of the water in the water reservoir 14, as well the desired amount of time to raise the temperature of the mirror 16 to the dew point).

Optionally, the mirror enclosure 12 includes one or more valves (not shown for clarity) which may be used to regulate the flow rate of water exiting the internal cavity 18. The valves may be fluidly coupled to one or more of the water drains 46. For example, the valves may be adjustable to allow the user to control the water flow rate through the internal cavity 18. The valves may also allow the user to quickly drain the water from the internal cavity 18, for example, after the user is finished with fogless mirror assembly 10 and/or the temperature of the mirror 16 is at, above, or near the dew point before all of the water has exited the internal cavity 18.

Figure 9:
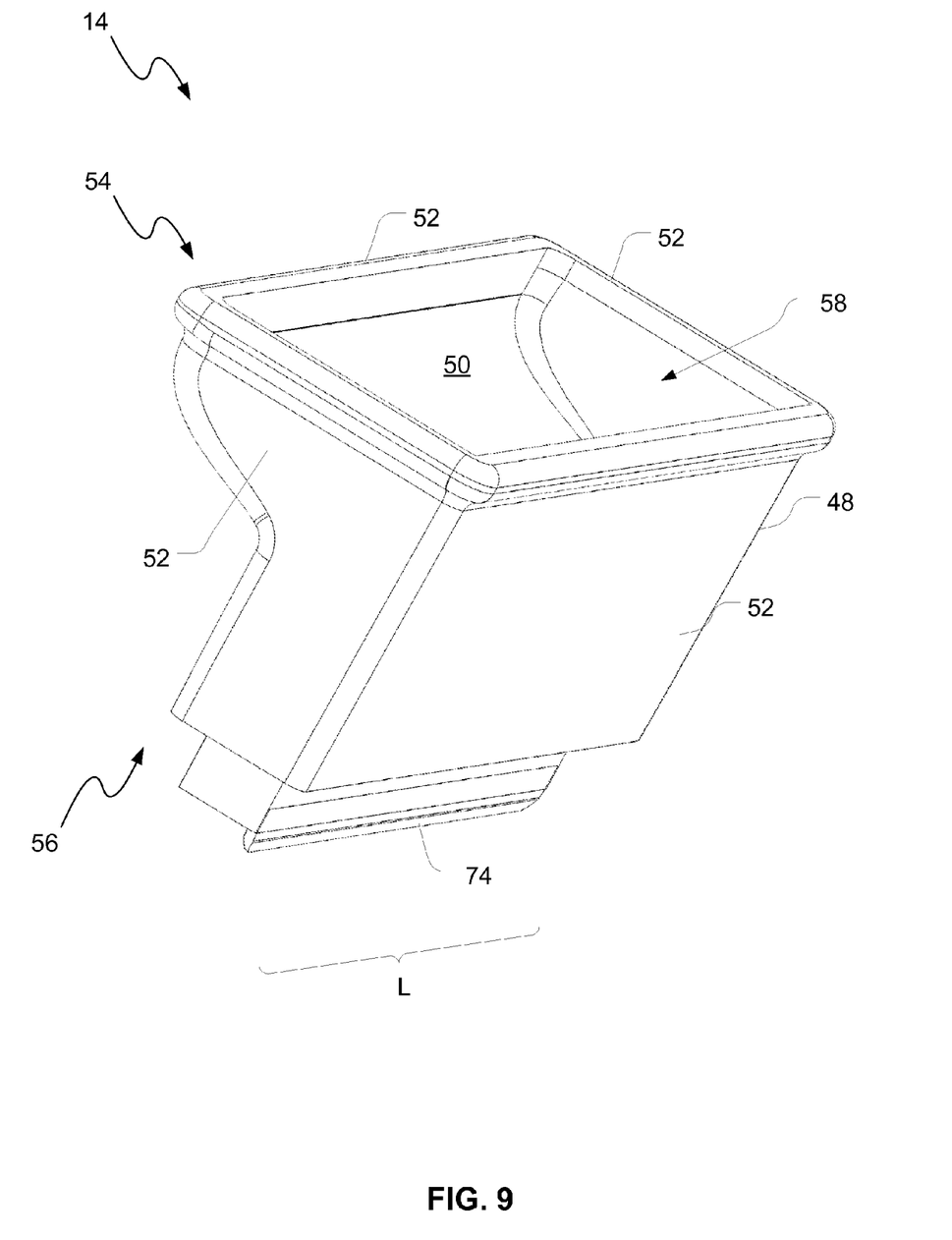
FIG. 9 generally illustrates a side, top perspective view of one embodiment of the water reservoir consistent with the present disclosure.
Figure 10:
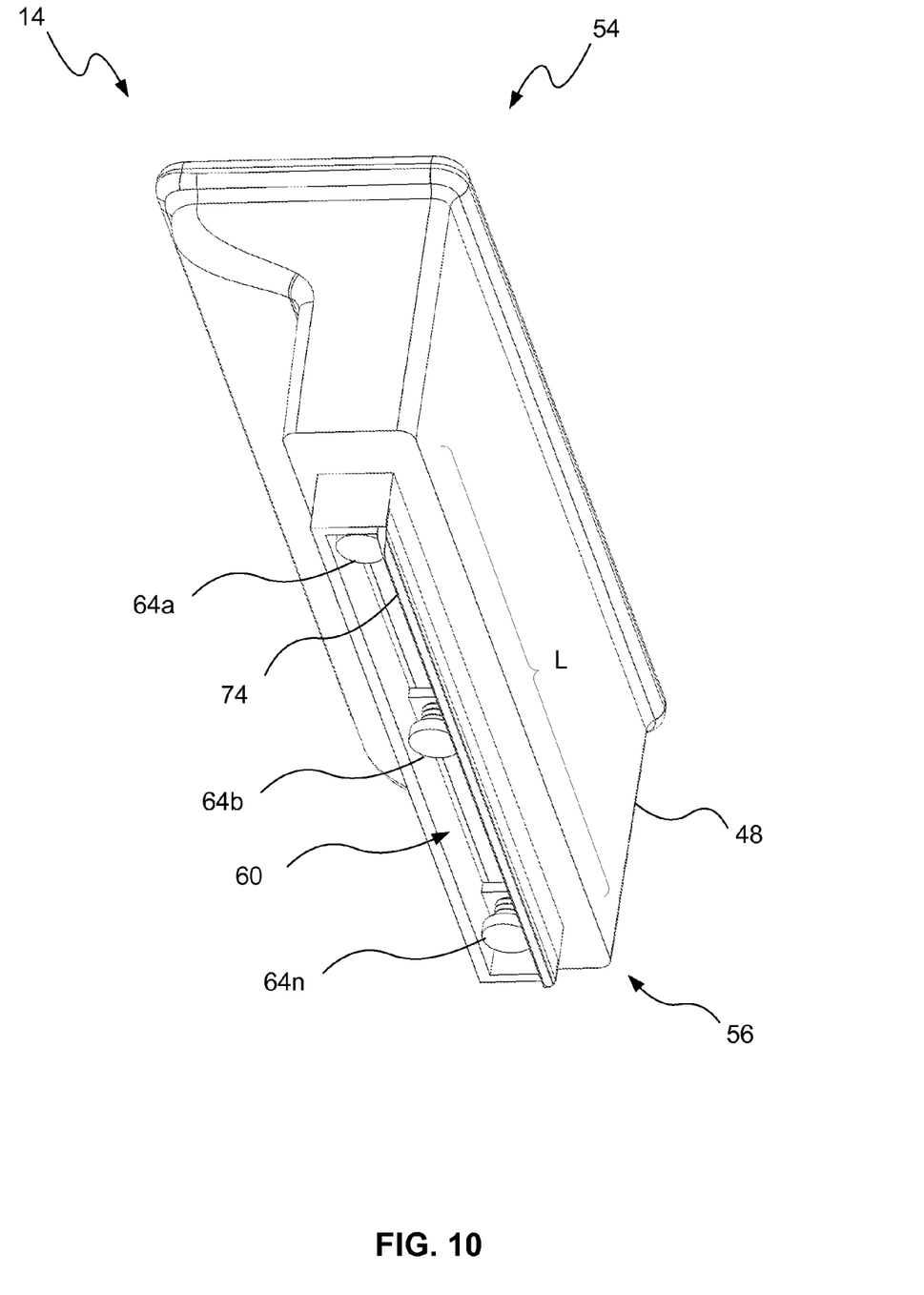
FIG. 10 generally illustrates a side, bottom perspective view of the water reservoir according one embodiment.
Figure 11:
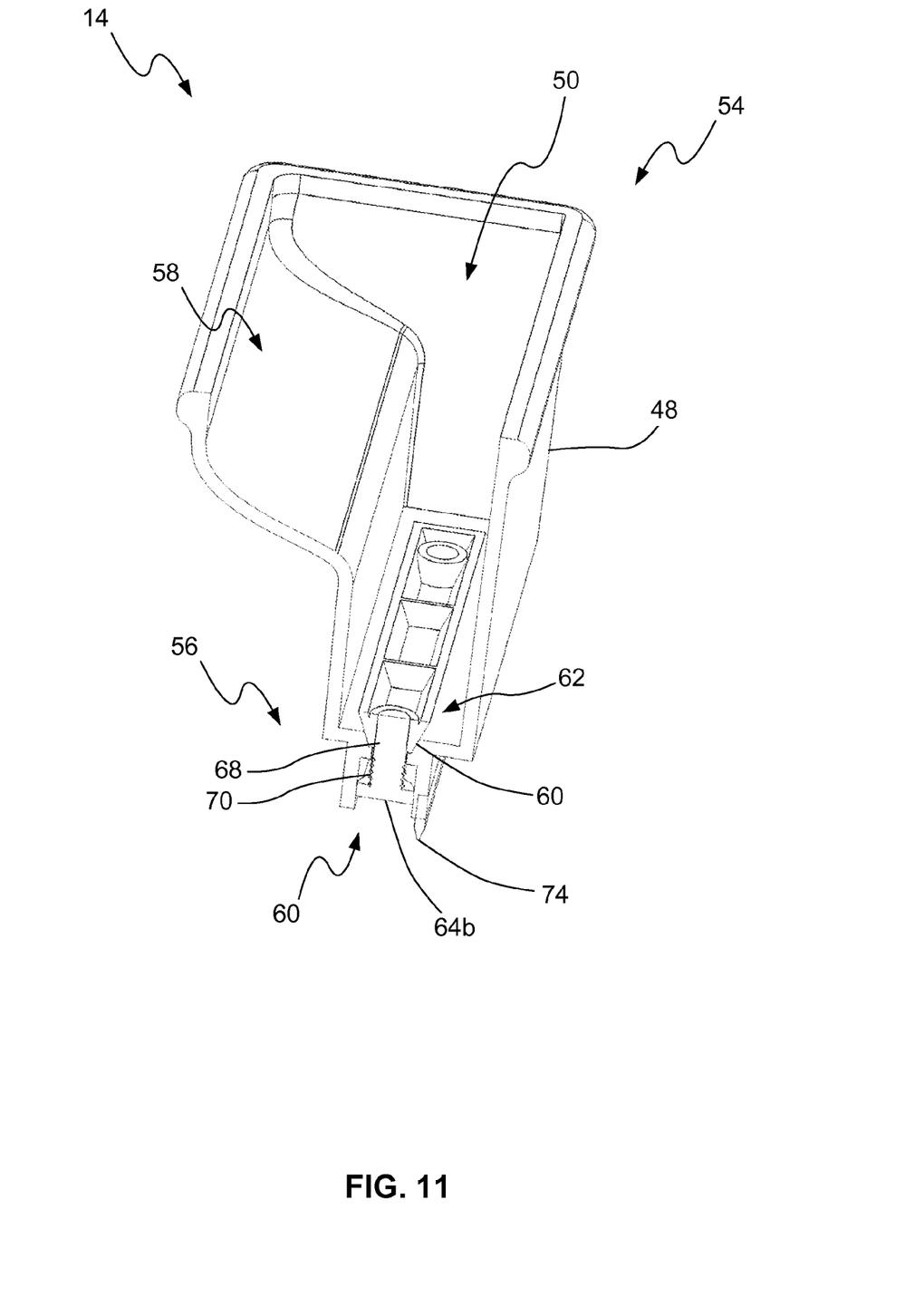
FIG. 11 generally illustrates a cross-sectional top perspective view of the water reservoir according one embodiment.
Figure 12:
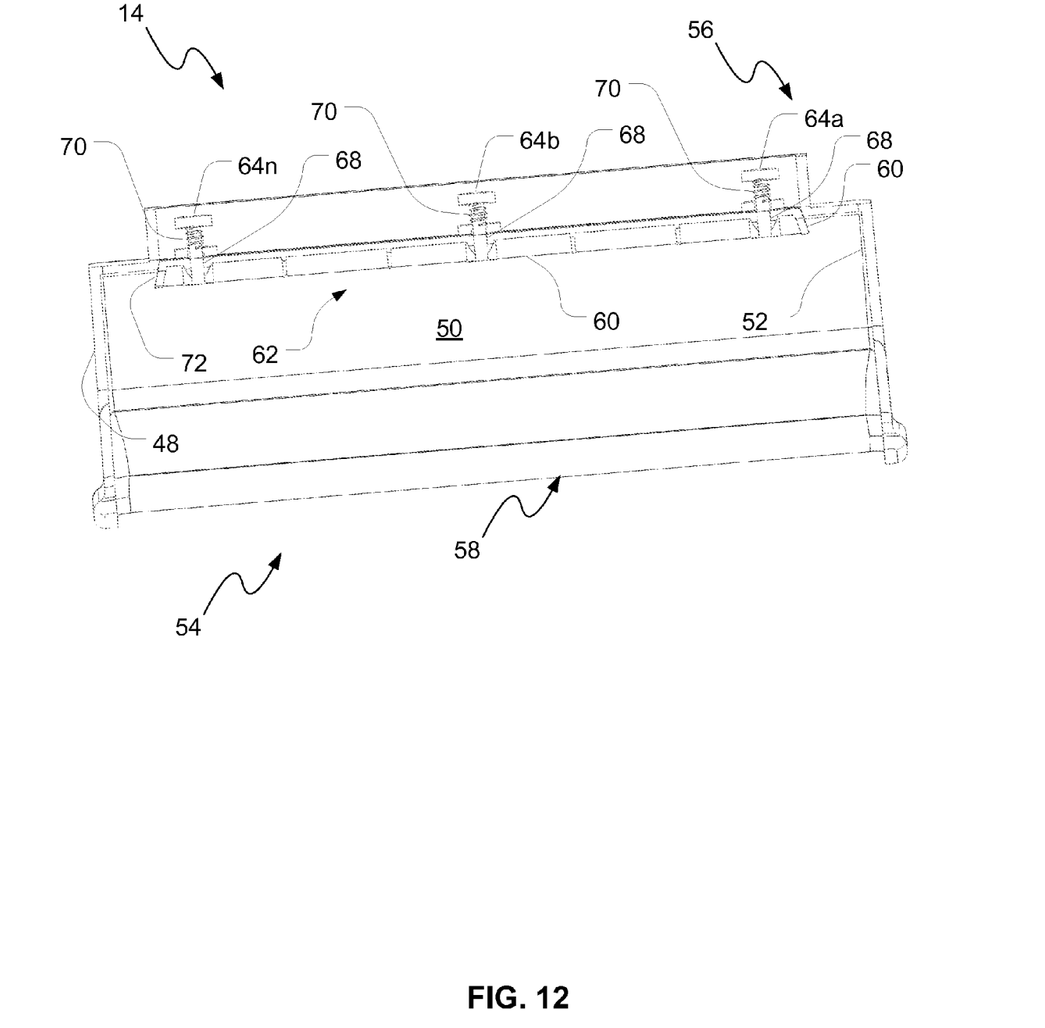
FIG. 12 generally illustrates a longitudinal cross-sectional bottom side view of the water reservoir according one embodiment.

Turning now to FIGS. 9-12, various views of one embodiment of the water reservoir 14 consistent with the present disclosure are generally illustrated. In particular, FIG. 9 shows a side, top perspective view of the water reservoir 14, FIG. 10 shows a side, bottom perspective view of the water reservoir 14, FIG. 11 shows a cross-sectional top perspective view of the water reservoir 14, and FIG. 12 shows a cross-sectional bottom perspective view of the water reservoir 14. The water reservoir 14 includes a body 48 defining a fluid compartment/well 50 configured to hold a predetermined volume of water. The water in the fluid compartment/well 50 may be at substantially the same temperature as the water being dispensed from the shower. The body 48 may include one or more sidewalls 52 which at least partially define the fluid compartment/well 50. The body 48 may also include a top portion 54 and at least a bottom portion 56.

The volume of the fluid compartment/well 50 (as well as the number, size, and configuration of the water drains 46) should be selected to ensure that enough thermal energy is transferred from the warm/hot water in the water reservoir 14 to the mirror 16 to heat the mirror from its starting temperature (e.g., ambient room temperature) to approximately the dew point based on the size of the mirror 16 and the intended operating conditions. The volume of water in the fluid compartment/well 50 and water drains 46 will therefore depend, at least in part, on the intended starting temperature of the mirror 16, the size of the mirror 16, and the dew point of the water vapor surrounding the fogless mirror assembly 10. As the ambient temperature of the mirror 16 becomes cooler and/or the dew point increases, the volume of water necessary to heat the mirror 16 increases. Similarly, as the ambient temperature of the mirror 16 becomes warmer and/or the dew point decreases, the volume of water necessary to heat the mirror 16 decreases.

According to one embodiment, the starting temperature (e.g., ambient room temperature) may range between 55° F. to 75° F., the dew point may range from about 110° F. to 120° F., and the mirror may be approximately 7.5 inches tall, by 5.5 inches wide, and 1.0 mm thick. For example, the fluid compartment/well 50 of the water reservoir 14 may hold 6.2 oz of warm/hot water when designed to heat the exemplary mirror from an ambient temperature greater than 60° F. to a temperature of approximately 115° F. (e.g., the approximate temperature of the warm/hot water dispensed from the shower) and the two water drains 46 may be configured to drain the 6.2 oz of water in approximately 1 minutes, 10 seconds. In contrast, the fluid compartment/well 50 may hold 12.4 oz of warm/hot water (e.g., at least twice the volume) when designed to heat the exemplary mirror from an ambient temperature less than 60° F. to a temperature of approximately 115° F. with the same water drains 46 as the previous example.

The water reservoir 14 includes at least one opening 58 (best seen in FIGS. 9, 11, and 12) and at least one outlet 60 (best seen in FIGS. 10-12). The opening 58 is configured to receive water to fill the fluid compartment/well 50. According to one embodiment, the opening 58 may be defined in the top portion 54 of the body 48. Optionally, the water reservoir 14 may include one or more covers, caps, lids, or the like (not shown for clarity) configured to generally enclose (e.g., seal) the opening 58 to reduce or prevent water from accidentally spilling out of the fluid compartment/well 50.

With reference to FIGS. 10-12, the outlet 60 is configured to allow water from the fluid compartment/well 50 of the water reservoir 14 to flow into the internal cavity 18 through the water inlet 42 of the mirror enclosure 12 when the water reservoir 14 is coupled to the mirror enclosure 12. The water reservoir 14 may include one or more outlet valves 62 configured to selectively open and/or close the outlet 60. The outlet valves 62 may include any known valve design. For example, the outlet valves 62 may be manually operated by the user and may include a handle, switch, knob, or the like (not shown) that a user operates to manually open and/or close the outlet valve 62.

According to another embodiment, the outlet valves 62 may be automatically opened. For example, the outlet valve 62 may include one or more valve elements 64a-64n configured to engage with the corresponding valve elements 44a-44n of the water inlet 42 to automatically open the outlet valve 62 of the water reservoir 14 to allow water from the water reservoir 18 to flow into the water inlet 42, and ultimately into the internal water cavity 18, when the water reservoir 14 is coupled to the mirror enclosure 12.

One example of the outlet valve 62 and valve elements 64a-64n is generally illustrated in FIGS. 10-12. The outlet valve 62 may include one or more plungers 66, one or more valve stems 68, and one or more springs 70. The body 48 may include one or more valve seats 72, which may be disposed around the periphery of the outlet 60. The plungers 66 are configured to form a generally water-tight seal with the valve seats 72 to selectively seal (e.g., open and close) the outlet 60. The springs 70 apply a biasing force against the valve stems 68 and the body 48 to bias the plungers 66 against the valve seat 72 and thereby seal the outlet 60.

When the water reservoir 14 is coupled to the mirror enclosure 12, the valve elements 64a-64n of the outlet valve 62 engage with the corresponding valve elements 44a-44n of the water inlet 42 to automatically open the outlet valve 62 of the water reservoir 14 to allow water from the water reservoir 18 to flow into the water inlet 42, and ultimately into the internal water cavity 18. For example, the bottom portion 56 of the water reservoir 14 may be advanced into the support cavity 39 of the mirror enclosure 12. The valve elements 44a-44n (e.g., bosses) push the valve stems 68 against the springs 70 to cause the plungers 66 to move away from the valve seats 72, thereby opening the outlet 60.

It should be noted, however, that the valve elements 44a-44n/64a-64n, which cause the outlet valve 62 to automatically open when the water reservoir 14 is coupled to the mirror enclosure 12, are not limited to the embodiment described above, but rather may include any design known to those of ordinary skill in the art. It should also be noted that the outlet valve 62 may be manually operated by the user.

Optionally, the water reservoir 14 may include a squeegee 74 (best illustrated in FIGS. 9-11) which may be used to clear water droplets from the surface of the mirror 16. For example, the squeegee 74 may be coupled to the body 48 of the water reservoir 12. In the exemplary embodiment, the squeegee 74 integrally coupled to the body 48 proximate to the outlet valve 62 and has a length L (FIGS. 9 and 10) which substantially corresponds to the width W (FIG. 1) of the mirror 16. Alternatively (or in addition), the squeegee 74 may be removably coupled to the body 48 of the water reservoir 14 and/or the squeegee 74 may be completely separate from the water reservoir 14.

While the mirror enclosure 12 and the water reservoir 14 have been illustrated as two separate components which may be coupled together, it should be appreciated that the mirror enclosure 12 and the water reservoir 14 may be integral components. In such an embodiment, the mirror assembly may be removed from the support (e.g., wall), and the water reservoir may be filled with the desired volume of warm/hot water. The mirror assembly may then be secured to the wall, and the water drain 46 may be opened to allow the warm/hot water to flow through the internal cavity 18 and heat the mirror 16.

According to one aspect, the present disclosure features a fogless mirror assembly including a water reservoir and a mirror enclosure. The water reservoir defines a fluid cavity configured to hold a volume of water. The mirror enclosure includes a mirror and a frame defining an internal cavity configured to be fluidly coupled to the water reservoir and to transfer thermal energy from water within the internal cavity to the mirror. The internal cavity further includes a water drain configured to allow water to exit the internal cavity.

According to another aspect, the present disclosure features a fogless mirror assembly a water reservoir and a mirror enclosure. The water reservoir defines a fluid cavity configured to hold a volume of water, an opening for filling the fluid cavity, a water outlet, and an outlet valve for selectively sealing the water outlet. The mirror enclosure includes a mirror and a frame configured to be removably coupled to the water reservoir. The frame defines an internal cavity having a water inlet configured to receive water from the water outlet of the water reservoir and a water drain configured to allow water to exit the internal cavity. A rear surface of the mirror is configured to contact water within the internal cavity and transfer thermal energy from the water to the mirror to increase the temperature of the mirror from a starting temperature to approximately a dew point of water vapor proximate to mirror as the water flows through the internal cavity.

According to yet another aspect, the present disclosure features a fogless mirror assembly including a mirror enclosure and a water reservoir configured to be removably coupled to the mirror enclosure. The mirror enclosure includes a mirror and a frame defining an internal cavity having a water inlet and a water drain. The water reservoir defines a fluid cavity and includes a water outlet and an outlet valve configured to automatically open the water outlet when the water reservoir is coupled to the mirror enclosure such that a volume of water flows from the fluid cavity, into the internal cavity through the water inlet, and exits the internal cavity through the water drain to transfer thermal energy from the water to the mirror thereby increasing the temperature of the mirror from a starting temperature to approximately a dew point of water vapor proximate to mirror.

As used in any embodiment herein, "circuitry" may comprise, for example, singly or in any combination, hardwired circuitry, programmable circuitry, state machine circuitry, and/or firmware that stores instructions executed by programmable circuitry.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

The terms "first," "second," "third," and the like herein do not denote any order, quantity, or importance, but rather are used to distinguish one element from another, and the terms "a" and "an" herein do not denote a limitation of quantity, but rather denote the presence of at least one of the referenced item.

While the principles of the present disclosure have been described herein, it is to be understood by those skilled in the art that this description is made only by way of example and not as a limitation as to the scope of the invention. The features and aspects described with reference to particular embodiments disclosed herein are susceptible to combination and/or application with various other embodiments described herein. Such combinations and/or applications of such described features and aspects to such other embodiments are contemplated herein. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A fogless mirror assembly comprising:
a water reservoir defining a fluid cavity configured to hold a volume of water, said water reservoir comprising an opening for filling said fluid cavity with water and a water outlet including an outlet valve; and
a mirror enclosure including a mirror and a frame defining an internal cavity configured to be fluidly coupled to said water reservoir, wherein a rear surface of said mirror is configured to contact water within said internal water cavity and said internal cavity includes a water drain configured to allow water to exit said internal cavity;
wherein said water reservoir is configured to be removably coupled to said mirror enclosure, and wherein said outlet valve is configured to be closed in response to said water reservoir being uncoupled from said mirror enclosure and said outlet valve is configured to be open in response to said water reservoir being coupled to said mirror enclosure.

2. The fogless mirror assembly of claim 1, wherein said mirror enclosure further includes a support cavity configured to receive and be selectively coupled to a portion of said water reservoir.

3. The fogless mirror assembly of claim 1, wherein said frame includes at least one boss extending outwardly configured to open said outlet valve of said water reservoir in response to said water reservoir being coupled to said mirror enclosure.

4. The fogless mirror assembly of claim 3, wherein said outlet valve comprises a plunger coupled to a valve stem, and a spring biasing said plunger against said water outlet of said water reservoir, and wherein said boss is configured to push said valve stem against said spring and move said plunger away from and open said outlet valve.

5. The fogless mirror assembly of claim 1, wherein said mirror enclosure further includes at least one light configured to illuminate an area in front of said mirror.

6. The fogless mirror assembly of claim 1, wherein said water reservoir further includes a squeegee.

7. The fogless mirror assembly of claim 6, wherein said squeegee has a length which substantially corresponds to a width of said mirror.

8. The fogless mirror assembly of claim 1, wherein said mirror enclosure further includes at least one suction cup configured to releasably secure said mirror assembly to a wall.

9. The fogless mirror assembly of claim 1, wherein said mirror includes polished stainless steel.

10. The fogless mirror assembly of claim 1, wherein said mirror enclosure further includes a music player.

11. The fogless mirror assembly of claim 1, wherein said water drain is configured to be selectively opened and closed.

12. The fogless mirror assembly of claim 1, wherein said outlet valve is configured to be manually opened and closed by a user.

13. A fogless mirror assembly comprising:
a water reservoir defining a fluid cavity configured to hold a volume of water, an opening for filling said fluid cavity, a water outlet, and an outlet valve to selectively seal said water outlet; and
a mirror enclosure including a mirror and a frame configured to be removably coupled to said water reservoir, wherein said mirror enclosure defines an internal cavity comprising a water inlet configured to receive water from said water outlet of said water reservoir when coupled to said water reservoir and a water drain configured to allow water to exit said internal cavity, wherein a rear surface of said mirror is configured to contact water within said internal cavity, and wherein said outlet valve is configured to be sealed when said water reservoir is uncoupled from said mirror enclosure and configured to be unsealed when said water reservoir is coupled to said mirror enclosure.

14. The fogless mirror assembly of claim 13, wherein said outlet valve is configured to be unsealed in response to said water reservoir being coupled to said mirror enclosure.

15. A fogless mirror assembly comprising:
a mirror enclosure including a mirror and a frame defining an internal cavity comprising a water inlet and a water drain; and
a water reservoir configured to be removably coupled to said mirror enclosure, said water reservoir defining a fluid cavity and including a water outlet and an outlet valve configured to open when said water reservoir is coupled to said mirror enclosure such that a volume of water flows from said fluid cavity and said water outlet, into said internal cavity through said water inlet, and exits said internal cavity through said water drain to transfer thermal energy from said water to said mirror thereby increasing the temperature of said mirror from a starting temperature to at least approximately a dew point of water vapor proximate to mirror.

16. The fogless mirror assembly of claim 13, wherein said volume of said fluid cavity of said water reservoir is sized to supply a sufficient volume of water to flow through said internal cavity to transfer enough thermal energy from said water to said mirror to increase the temperature of said mirror from a starting temperature to at least approximately a dew point of water vapor proximate to mirror as said water flows through said internal cavity.

* * * * *